United States Patent
Neft

(10) Patent No.: US 9,027,005 B2
(45) Date of Patent: May 5, 2015

(54) SINGLE CODE SET APPLICATIONS EXECUTING IN A MULTIPLE PLATFORM SYSTEM

(71) Applicant: Accenture Global Services Limited, Dublin (IE)

(72) Inventor: Mark Neft, Caldwell, NJ (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/297,694

(22) Filed: Jun. 6, 2014

(65) Prior Publication Data

US 2014/0289714 A1    Sep. 25, 2014

Related U.S. Application Data

(63) Continuation of application No. 12/652,667, filed on Jan. 5, 2010, now Pat. No. 8,813,048.

(60) Provisional application No. 61/177,149, filed on May 11, 2009.

(51) Int. Cl.
*G06F 9/45* (2006.01)
*G06F 9/44* (2006.01)

(52) U.S. Cl.
CPC .. *G06F 8/76* (2013.01); *G06F 8/31* (2013.01); *G06F 8/41* (2013.01)

(58) Field of Classification Search
None
See application file for complete search history.

(56) References Cited

U.S. PATENT DOCUMENTS

| | | | |
|---|---|---|---|
| 5,960,200 A | 9/1999 | Eager | |
| 6,154,877 A | 11/2000 | Ramkumar | |
| 6,161,219 A | 12/2000 | Ramkumar | |
| 6,615,166 B1 | 9/2003 | Guheen | |
| 6,654,954 B1 * | 11/2003 | Hicks | 717/162 |
| 6,968,370 B2 | 11/2005 | Wu | |
| 7,150,012 B2 * | 12/2006 | Hill | 717/158 |
| 7,634,762 B1 | 12/2009 | Wheeler | |
| 7,720,970 B2 | 5/2010 | Dube | |
| 7,730,468 B1 | 6/2010 | Trowbridge | |
| 7,757,214 B1 | 7/2010 | Palczak | |
| 7,818,410 B1 | 10/2010 | Barnes | |
| 7,853,742 B2 * | 12/2010 | Rothman et al. | 710/68 |
| 8,095,929 B1 | 1/2012 | Ji | |
| 8,266,582 B2 * | 9/2012 | Prakash | 717/106 |

(Continued)

OTHER PUBLICATIONS

Perrone et al., "zSeries and z/OS HiperSockets Overview," Jan. 2003, IBM System Magazine, 5 pages.

(Continued)

*Primary Examiner* — Steven Snyder
(74) *Attorney, Agent, or Firm* — Fish & Richardson P.C.

(57) ABSTRACT

Embodiments of the claimed subject matter are directed to methods and a system that allows an application comprising a single code set under the COBOL Programming Language to execute in multiple platforms on the same multi-platform system (such as a mainframe). In one embodiment, a single code set is pre-compiled to determine specific portions of the code set compatible with the host (or prospective) platform. Once the code set has been pre-compiled to determine compatible portions, those portions may be compiled and executed in the host platform. According to these embodiments, an application may be executed from a single code set that is compatible with multiple platforms, thereby potentially reducing the complexity of developing the application for multiple platforms.

16 Claims, 7 Drawing Sheets

(56) References Cited

U.S. PATENT DOCUMENTS

| | | |
|---|---|---|
| 8,458,676 B2 * | 6/2013 | Asai et al. ............. 717/139 |
| 2003/0187915 A1 | 10/2003 | Sun |
| 2004/0194055 A1 | 9/2004 | Galloway |
| 2005/0091649 A1 | 4/2005 | Qureshi |
| 2006/0031813 A1 | 2/2006 | Bishop |
| 2006/0123111 A1 | 6/2006 | Dea |
| 2006/0136695 A1 | 6/2006 | Vaupel |
| 2006/0136910 A1 | 6/2006 | Brickell |
| 2006/0136911 A1 | 6/2006 | Robinson |
| 2006/0136912 A1 | 6/2006 | Robinson |
| 2006/0150148 A1 | 7/2006 | Beckett |
| 2007/0240143 A1 | 10/2007 | Guminy |
| 2008/0184195 A1 | 7/2008 | Lee |
| 2008/0270515 A1 | 10/2008 | Chen |
| 2008/0313257 A1 | 12/2008 | Allen |
| 2009/0313004 A1 | 12/2009 | Levi |
| 2009/0328033 A1 | 12/2009 | Kohavi |
| 2010/0191854 A1 | 7/2010 | Isci |
| 2010/0287542 A1 | 11/2010 | Neft |
| 2010/0287549 A1 | 11/2010 | Neft |
| 2010/0287560 A1 | 11/2010 | Neft |
| 2011/0289491 A1 * | 11/2011 | Hsiao ..................... 717/140 |
| 2013/0036409 A1 * | 2/2013 | Auerbach et al. ......... 717/140 |

OTHER PUBLICATIONS

White et al., "HiperSockets Implementation Guide," 132 pages, Mar. 2007.

U.S. Non-Final Office Action for U.S. Appl. No. 12/652,667 dated Sep. 19, 2013, 34 pages.

U.S. Notice of Allowance for U.S. Appl. No. 12/652,667 dated Feb. 27, 2014, 9 pages.

U.S. Notice of Allowance for Appl. No. 12/652,667 dated Jun. 2, 2014, 13 pages.

'z/OS Basic Skills Information Center—Mainframe Concepts' copyright IBM Corp. 2005, 2008.

Wikipedia's article on 'Just-in-time Compilation' from Oct. 14, 2007.

'Single Source for Multiple Platforms' by HP and Intel, copyright Apr. 2010.

'Oracle Identity Manager—Connector Guide for IBM RACF Advanced' Release 9.0.2, Sep. 2006.

* cited by examiner

SINGLE CODE SET APPLICATIONS EXECUTING IN A MULTIPLE PLATFORM SYSTEM

CLAIM OF PRIORITY

This application is a continuation of U.S. application Ser. No. 12/652,667, filed Jan. 5, 2010, now allowed, which claims priority to provisional patent application entitled "Optimizing A Distribution of Applications Operating In A Multiple Environment System," Ser. No. 61/177,149 filed on May 11, 2009.

BACKGROUND

Mainframes are computing systems used mainly by large businesses and organizations for executing mission and task-critical applications (such as bulk data processing) that are often essential to the core of the business or organization. Through a combination of advanced processing abilities and specialized software applications, usage of mainframe systems is often capable of providing a competitive advantage to a business or organization. As mainframes are often critical to the success or even continuation of a business's operations, mainframes are designed for the purposes of longevity, fault tolerance, and durability.

In addition, mainframes also offer vastly increased computing performance relative to ordinary person computers. Compared to a personal computer such as a PC, mainframes will commonly have hundreds to thousands of times as much data storage, and the capability to access, manipulate, and the ability to perform operations on such data much faster. Mainframes are designed to handle very high volumes of input and output (I/O) and emphasize throughput computing. Some popular mainframe designs have included several subsidiary computers (called channels or peripheral processors) which manage the I/O devices, leaving the central processing unit (CPU) free to deal only with high-speed memory. In addition, typical mainframe applications are often used to perform tasks which are essential to the core of the business operating the mainframe.

In addition, nearly all conventional mainframes also have the ability to run (or host) multiple operating systems, and thereby operate not as a single computer but as a number of virtual machines. This is most commonly achieved through the use of multiple logical partitions. Each logical partition, commonly referred to as a "LPAR," is a subset of a computing system's hardware resources that is virtualized as a separate computer. In this role, a single mainframe can replace dozens or even hundreds of smaller servers. As a general practice, mainframes often utilize the proprietary operating system of the mainframe's manufacturer, and conventional implementations often feature a single mainframe operating numerous instances of the same operating system. Recent developments have enabled the combination of various, disparate operating systems operating in distributed logical partitions in the same mainframe.

Unfortunately, mainframes are typically very expensive to purchase and procure. Mainframe operating systems and applications can also be very expensive to develop and/or license. Due to the relatively small number of mainframe manufacturers and software developers, mainframe consumers typically have few options beyond a mainframe manufacturer's proprietary operating system. Naturally, reliance on a single, proprietary operating system can be expensive and licensing fees for the proprietary operating system can contribute significantly to the cost of owning and operating a mainframe, as well as purchasing mainframe computing services. Moreover, these fees are almost certain to continue to increase for a mainframe consumer over a mainframe's lifetime due to maintenance and upgrade fees.

An alternative to actual ownership of mainframes is to rent mainframe computing services from a mainframe service provider. However, a service purchasing arrangement with these providers (which can be the mainframe manufacturers themselves) can often be just as expensive over time. Limiting the cost of mainframe ownership and operation has been difficult to achieve, historically. Purchasing additional third party software is one approach to limiting the cost (e.g., eliminating the cost of developing proprietary software). However, this approach also eliminates the competitive advantages of developing proprietary applications. This approach also requires additional licensing fees and may not substantially reduce the cost of operation and/or ownership.

The programming language COBOL (abbreviation of Common Business-Oriented Language) is popular in the development of many business, administrative, and accounting applications and software systems for mainframe computing systems. Unfortunately, due to a lack of conditional compiling functionality native to the language, the COBOL language is not particularly well suited to multi-operating system execution. As a result, multiple versions may be separately developed for any single application or software system to be compliant with, and executable on, disparate operating systems. This is true even if, at least initially, only minor deviations are required between each platform-specific version. The problem is further exacerbated as development continues independently since divergence may increase with subsequent updates. After a number of iterations and developmental cycles, the same application may be substantially different for multiple platforms, potentially increasing the complexity of simultaneously developing the application for each platform drastically.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to methods and a system that allows an application comprising a single code set under the COBOL Programming Language to execute in multiple platforms on the same multi-platform system (such as a mainframe). In one embodiment, a single code set is pre-compiled to determine specific portions of the code set compatible with the host (or prospective) platform. According to various embodiments, the specific portions of the code set compatible with the host platform may be determined according to programming instructions according to a conventional begin/end format. In alternate embodiments, the portions of the code set may be determined according to structured comments. Once the code set has been pre-compiled to determine compatible portions, those portions may be compiled and executed in the host platform. According to these embodiments, an application may be executed from a single code set that is compatible with multiple platforms, thereby potentially reducing the complexity of developing the application for multiple platforms.

In another embodiment, pre-processing a code set to determine platform compatible portions is performed once the application executed from the code set is migrated from one platform to a second, disparate platform in a multi-platform system. According to these embodiments, migration is performed by evaluating the processes executing in a partition operating under a proprietary operating system, determining a collection of processes from the processes to be migrated, prioritizing the collection of processes in an order of migration and incrementally migrating the processes according to the order of migration to another partition in the mainframe executing an open-source operating system.

In yet another embodiment, a system is provided for pre-processing a single code set to determine platform-compatible portions to execute in a platform of a multi-platform system. According to further embodiments, the pre-processing may follow the migration of the application from a previously hosting platform to the current host platform. According to some embodiments, the system includes a mainframe with at least two logical partitions, with at least one platform executing on each of the partitions. Processes executing on one platform are migrated to the other platform to achieve an optimal distribution based on an evaluation of the cost of migration and the processes are pre-processed to determine which portions of the processes are compatible with the platform migrated to.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
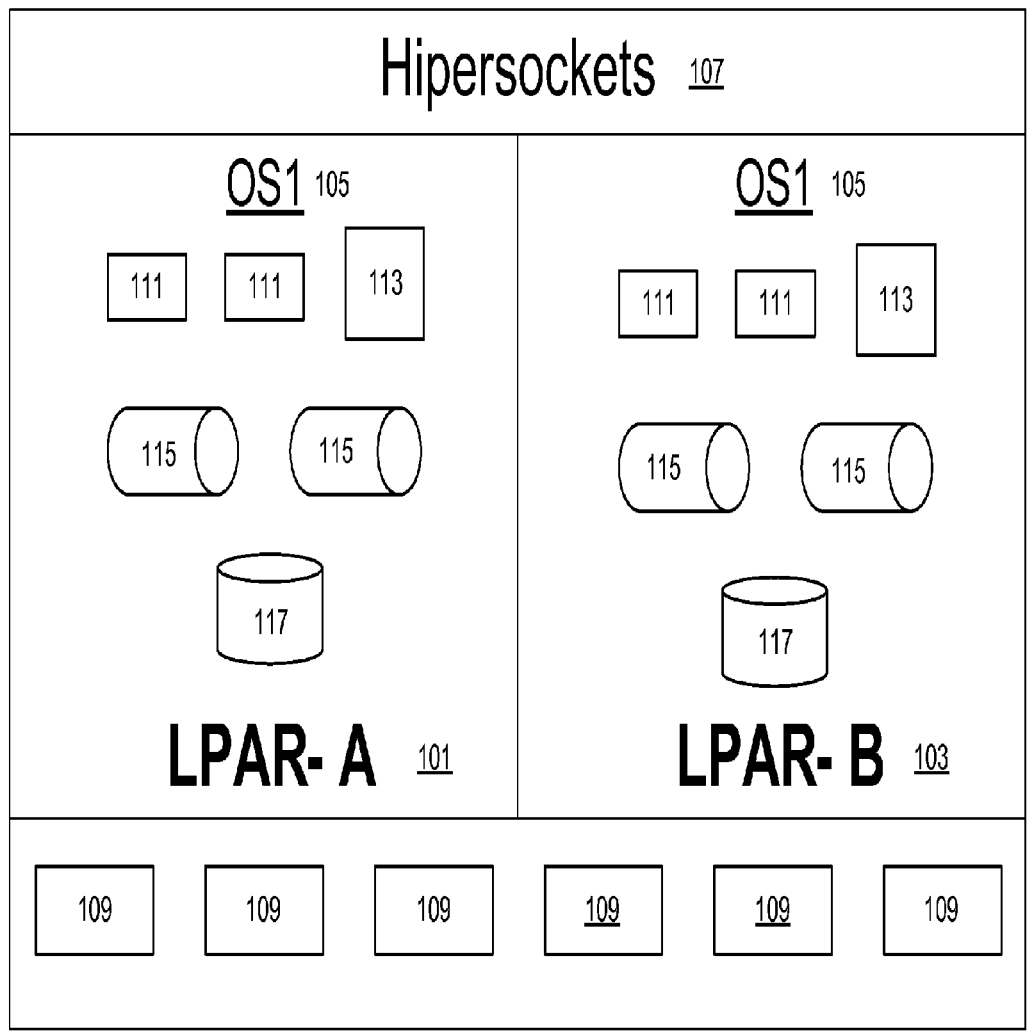
FIG. 1 depicts an exemplary conventional distribution of applications in a multi-partition mainframe, in accordance with various embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may, be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, ell-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein (e.g., FIGS. 6, 7) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Application Distribution in a Mainframe

According to embodiments of the present invention, a system for optimally distributing processes between platforms in a multi-platform system is provided. In one embodiment, a system comprising a plurality of logical partitions, each partition hosting at least one platform and each platform executing one or more processes is provided. FIG. 1 depicts an exemplary conventional distribution of applications in a multi-partition system 100, in accordance with embodiments of the present invention.

In one embodiment, system 100 may be implemented as, for example, a mainframe computing system. As depicted, system 100 is implemented as a mainframe computing system comprising a plurality of logical partitions (e.g., LPAR-A 101 and LPAR-B 103). As presented, each logical partition hosts at least one platform. In one embodiment, the platform is implemented as an operating system (e.g., OS1 105). In further embodiments, these operating systems may be proprietary operating systems licensed by the mainframe's manufacturer. In a typical configuration, each partition is communicatively coupled via inter-partition communication means such as through a bus or through memory via a protocol (e.g., Hipersockets 107). As depicted in FIG. 1, system 100 includes hipersockets 107 to facilitate communication between the separate partitions 101, 103.

In some embodiments, the system 100 may have a plurality of applications executing in one or more of the system's partitions 101, 103. In a typical embodiment, these applications may include, but are not limited to, transaction servers 111, databases 117 and database management applications 113, network communications software 115. These applications typically are executed from a code set comprised of a sequence of programmed routines and/or commands arranged in a structure and syntax according to (e.g., compatible with) the precepts of a programming language. According to typical embodiments, the applications comprise a code set compatible with the Common Business-Oriented Language (commonly referred to as "Cobol"). In still further embodiments, system 100 may also include specialized processors or engines (e.g., processors 109) for performing particular tasks only.

Execution of an application typically includes compilation and execution of the code set underlying the application. In some embodiments, for partitions 101, 103 hosting the same platform 105, one or more of the applications running in one partition (e.g., partition 101) may also be executed in the same platform 105 hosted on the second partition (e.g., partition 103). That is, multiple instances of the same underlying code set may be compiled and executed in multiple instances of the same platform. In alternate embodiments, an application may also be executed in different platforms if the underlying code set is compatible with both platforms. According to conventional practice, the underlying code set of the same application may be modified and specific to one or a relatively exclusive number of platforms. This is particularly true for applications with underlying code sets corresponding to traditional COBOL programming, where conditional pre-compiling is not inherently supported by the programming language.

According to embodiments of the present invention, however, an application having a single underlying code set comprising COBOL programming is capable of being executed from a plurality of platforms. This feature is provided through pre-processing of the code set to identify platform compatible portions of the code set which are then specifically compiled and executed, rather than substantially the entirety of the code set, as with typical processing techniques. In some embodiments, the platform compatible portions of the code set are identified via the usage of structured "comments" or pre-instructions in the code set which are typically disregarded during the compilation process. In alternate embodiments, platform compatible portions of the code set are identified via programmed instructions structured under popular "begin/end" formats.

Alternate Platforms on Additional Logical Partitions

Figure 2:
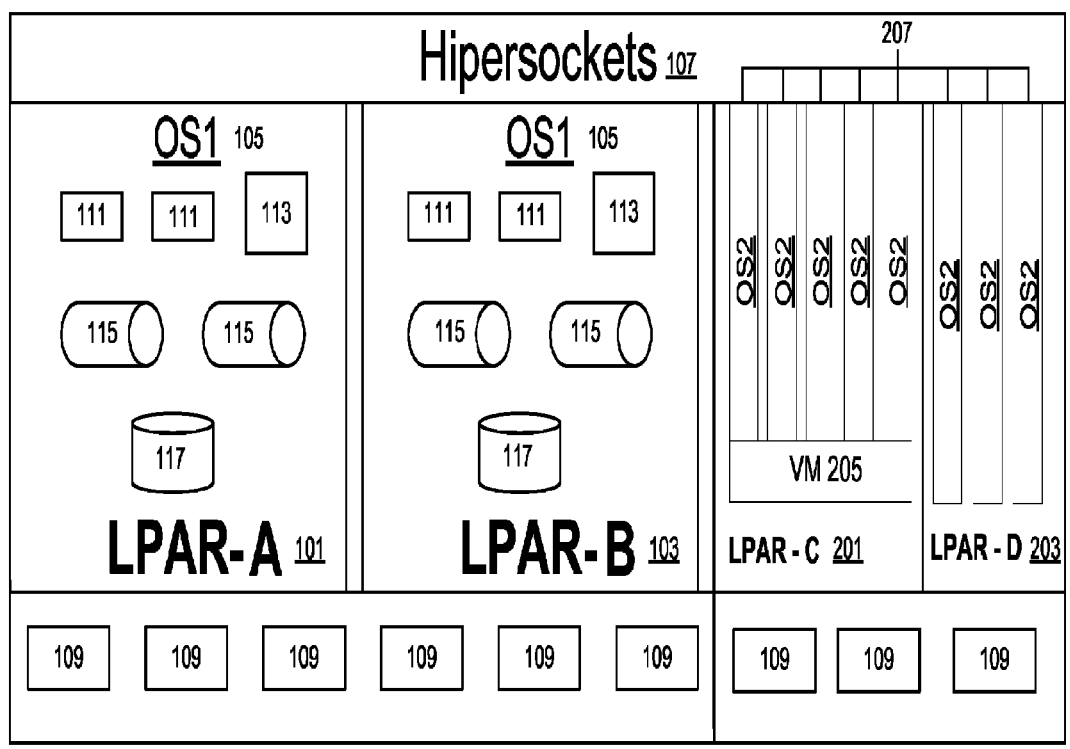
FIG. 2 depicts an exemplary distribution of applications in a multi-partition mainframe executing at least two operating systems, in accordance with various embodiments of the present invention.

In one embodiment, a mainframe or like computing system is configured to execute dissimilar platforms in multiple logical partitions. FIG. 2 depicts an exemplary distribution of applications in a multi-partition system 200 executing at least two operating systems, in accordance with various embodiments of the present invention. As presented, system 200 includes the logical partitions (e.g., LPAR-A 101 and LPAR-B 103) executing the same platform 105; hipersockets 107; applications (111, 113, 115, and 117) and specialized processors 109; described above with reference to system 100 of FIG. 1. In typical configurations, the platforms executing on the logical partitions LPAR-A 101 and LPAR-B 103 may, be proprietary, operating systems licensed by the mainframe's manufacturer. However, this may lead to significant and/or excessive operating costs.

As shown in FIG. 2, the cost of operating additional platforms may be mitigated through the execution of alternate, lower-cost, and non-proprietary platforms. These platforms (e.g., OS2 207) may be executed on additional logical partitions (e.g., LPAR-C 201, LPAR-D 203) in the system 200. In one embodiment, the platforms may be executed directly as operating systems (e.g., instances of OS2 207 in LPAR-D 203). In alternate embodiments, the platforms may also be instanced as virtual machines (e.g., VM 205 of LPAR-C 201). Therefore, by using lower-cost and/or non-proprietary platforms, a mainframe operator or mainframe service consumer may be able to mitigate much of the operational costs due to software licensing that has traditionally been an unavoidable cost of using a mainframe.

Application Migration Across Disparate Platforms

In some embodiments, the cost of operating a mainframe may be further reduced by migrating pre-executing processes in a higher-cost and/or proprietary platform to a lower-cost and/or non-proprietary platform while balancing costs to efficacy, security, reliability and/or performance. Accordingly, optimizing the balance of applications between each platform can result in significant savings while maintaining or exceeding current levels of performance. However, not every application executing in a platform may be amenable towards migration. For example, some applications may be intricately linked to a specific platform so as to make migration unbeneficial. In addition, many applications are executed from code sets which are compatible with only one platform or a suite of platforms. Naturally, migrating an application from one platform to a disparate platform may require platform specific code sets of the application.

Figure 3:
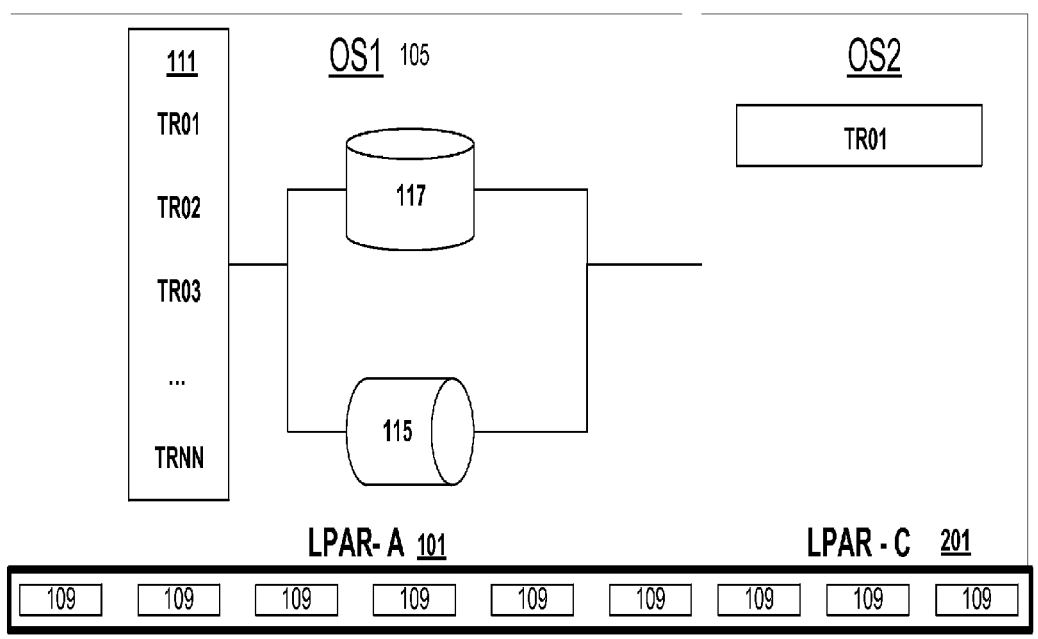
FIG. 3 depicts an exemplary migration of processes in a multi-platform mainframe executing at least two operating systems according to a first pre-defined stage, in accordance with various embodiments of the present invention.

FIG. 3 depicts an exemplary migration of processes in a multi-platform system executing at least two operating systems according to a first pre-defined stage 300, in accordance with various embodiments of the present invention. In a typical configuration, system 300 includes multiple logical partitions (e.g., LPAR-A 101, LPAR-C 201); a first platform (e.g., OS1 105) executing on a logical partition (e.g., LPAR-A 101); a second platform (e.g., OS2 207) executing on the other logical partition (e.g. LPAR-C 201); and a plurality of applications (111, 117, 115).

As depicted in FIG. 3, an application (e.g., application 111) executing on the first platform may perform, during execution, a plurality of processes and/or transactions. These processes and transactions may incorporate additional applications executing within and/or without the first platform. In one embodiment, an application and/or a specific process or transaction of an application may be migrated from being executed in the first platform to being executed in the second platform. Migration of a process or transaction may be performed by, for example, duplicating the execution of the target transaction or process in the second platform and temporarily executing the process or transaction in both platforms concurrently. According to some embodiments, migration of an application, process, or transaction may be preceded by pre-processing the underlying code set corresponding to the application, process or transaction to determine relevant portions of the code set that are compatible with the desired host (e.g., migration destination) platform.

Thus, for example, data used by the process or transaction executing in the first platform may be duplicated and used in the process or transaction executing in the second platform. In one embodiment, the process may be duplicated to have the same source code. In still further embodiments, the process may be structured so that the same data runs through both instances of the process. Alternatively, the process may be structured such that specific instructions may be performed in alternating instances, the instructions delegated by a load processor. As discussed above, communication and data may be transferred between platforms via inter-partition communication means (e.g., hipersockets 107).

In some embodiments, certain applications are dependent on the specific application or portions of a specific application and may not be easily migrated. In one embodiment, applications with the least amount of dependencies while recouping the highest amount of savings may be prioritized. To determine the viability of migrating an application between platforms, a heuristic may be used to determine the application's candidacy. In one embodiment, an application's candidacy may be determined by evaluating the application's dependencies and relative coupling to the underlying operating system. In still further embodiments, the application's candidacy may include an estimated savings in computing cost. An additional potential dependency of an application may include an incompatibility of the underlying code set corresponding to the application with the platform that is the migration destination. In these instances, a separate, platform compatible code set may be used to replace the previous code set of the application. According to further embodiments however, a single code set may be adapted to be executable in a plurality of disparate platforms via pre-processing the code set to identify platform compatible portions of the code set prior to execution. This process is provided in greater detail below, with reference to FIGS. 6 and 7.

In one embodiment, computing savings may be determined for a plurality of processes by generating the CPU consumption of an application or process, and parsing the source code for the application or process to determine the number of operands in the source code. The plurality of processes can subsequently prioritized by comparing the respective numbers of operands and CPU consumptions to determine the estimated savings.

In one embodiment, the dependencies of the specific applications in a platform may be determined by creating logic flows corresponding to each of the specific applications. The logic flows may be utilized to identify a demarcation of a process to migrate the process on to the other platform without increasing the latency and/or complexity of the operations.

In further embodiments, the target transaction or process may be monitored in the second platform to ensure the maintenance of certain standards or metrics (e.g., reliability, performance). In still further embodiments, a primary operation of the process or transaction may be transferred from the first platform to the second platform to increase testing or to complete migration, as desired. In one embodiment, one or more processes, transactions, or even applications may be migrated between platforms. According to these embodiments, the processes, transactions and applications executing in a first platform may be evaluated for suitability of migration. For example, certain applications which are intricately linked to the first platform may be unsuitable for migration, and thus may not be selected for migration. In some embodiments, migration of one or more applications may be performed in pre-defined stages, e.g., to minimize risk to the entire system. As depicted in FIG. 3, transaction 1 (e.g., TR01) is migrated between the first platform OS1 105 and the second platform OS2 207. In one embodiment, the first platform (e.g., OS1 105) may be implemented as a proprietary operating system licensed by the mainframe manufacturer. In some embodiments, the second platform (e.g., OS2 207) may be implemented as a lower-cost and/or non proprietary operating system.

Figure 4:
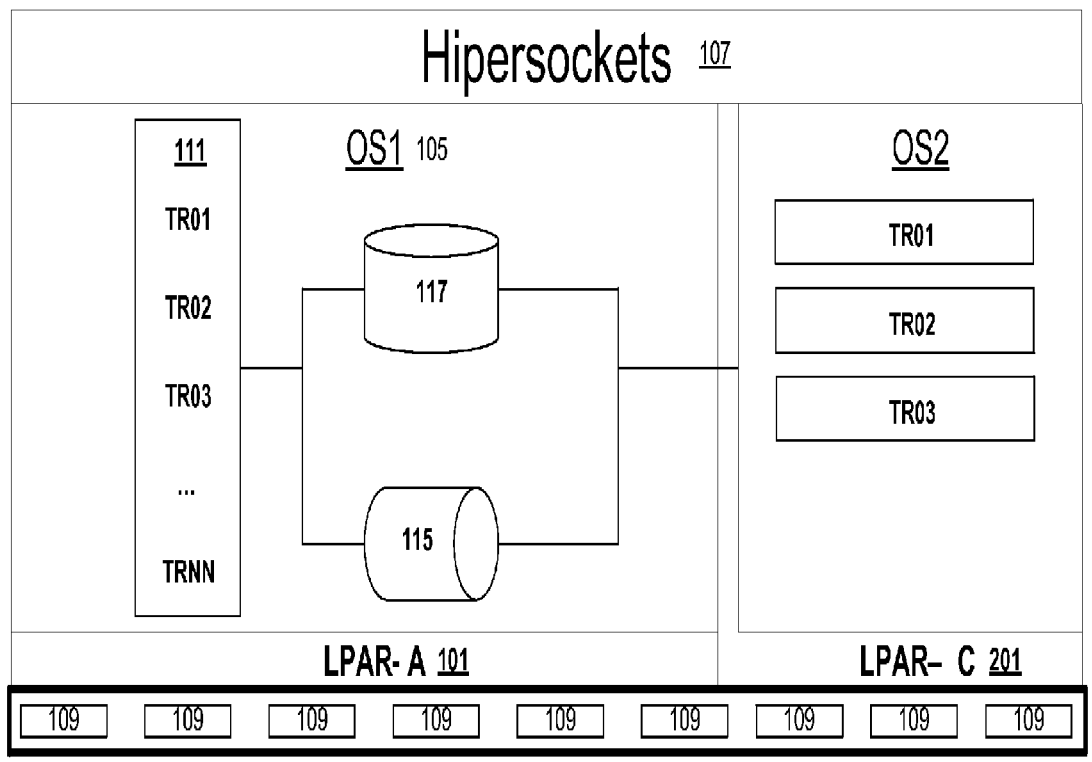
FIG. 4 depicts an exemplary migration of processes in a multi-platform mainframe executing at least two operating systems according to a second pre-defined stage, in accordance with various embodiments of the present invention.

FIG. 4 depicts an exemplary migration of processes in a multi-platform system executing at least two operating systems according to a second pre-defined stage 400, in accordance with various embodiments of the present invention. FIG. 4 includes the components of FIG. 3, but depicts the migration of additional transactions (e.g., TR02, TR03) comprising an application (e.g., application 111) from the first platform OS1 105 to the second platform OS2 207.

Figure 5:
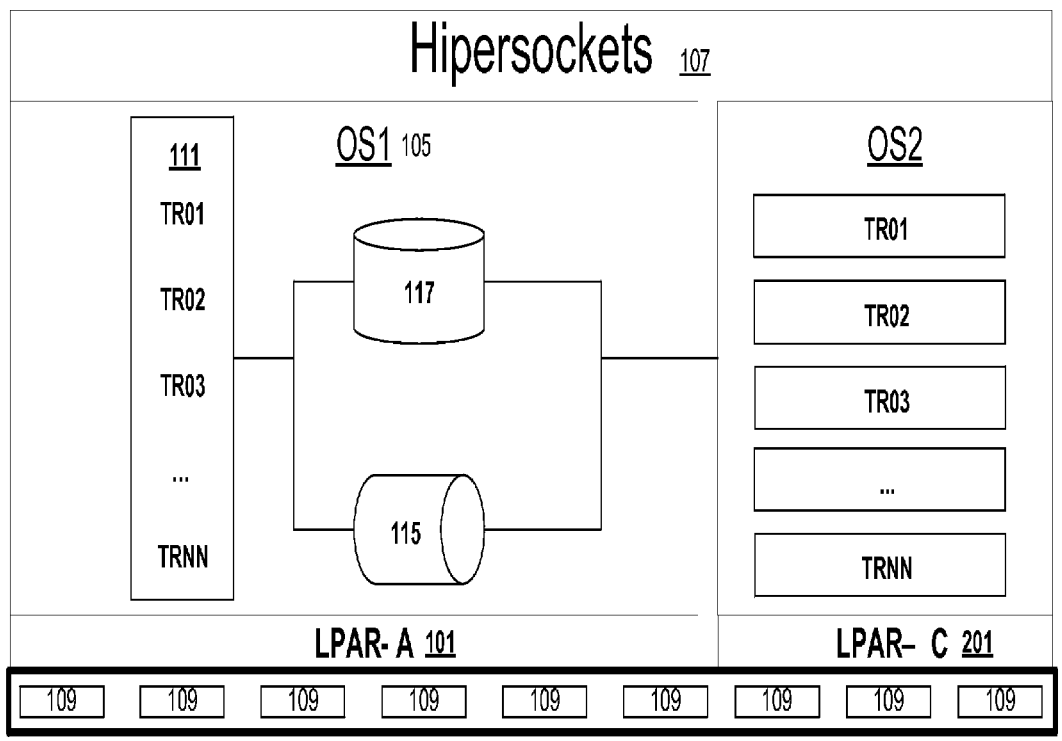
FIG. 5 depicts an exemplary distribution of processes in a multi-platform mainframe executing at least two operating systems after a process migration, in accordance with various embodiments of the present invention.

FIG. 5 depicts an exemplary distribution of processes in a multi-platform mainframe executing at least two operating systems after a process migration 500, in accordance with various embodiments of the present invention. FIG. 5 includes the components of FIGS. 3 and 4, and depicts the finalized migration of all of the transactions (e.g., TR02, TR03, . . . TRNN) comprising the application 111 from the first platform OS1 105 to the second platform OS2 207. Once an application or applications has/have been successfully migrated (e.g., is executing a platform compatible code set) from the first platform to one or more other platforms, primary operation of the application may be transferred, and execution of the application in the first platform may be terminated. Thus, in some embodiments, only the transactions or processes intricately linked or specific to the first platform (e.g., assemblers) will remain executing on the first platform after migration is completed.

Pre-Processing Code Set

Figure 6:
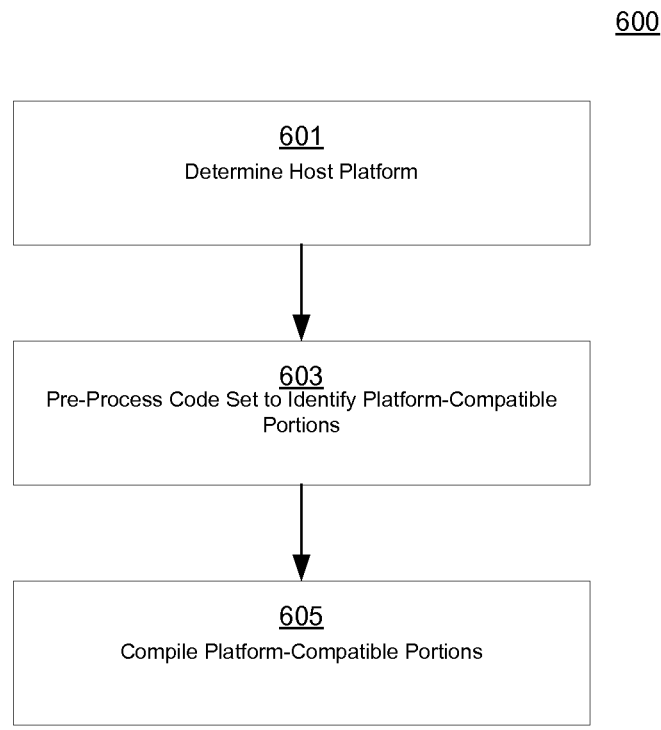
FIG. 6 depicts an exemplary flowchart of a process of optimizing the distribution of applications between platforms in a multi-platform system, in accordance with various embodiments of the present invention.

With reference to FIG. 6, an exemplary flowchart 600 of a process of pre-processing a single code set corresponding to an application to determine compatible portions of the code set with a host platform is depicted, in accordance with various embodiments of the present invention. In one embodiment, the code set comprises a sequence or series of pre-programmed instructions conforming to the COBOL programming language standard. Steps 601-605 describe exemplary steps of the flowchart 600 in accordance with the various embodiments herein described.

At step 601, the host platform is determined. In one embodiment, the host platform is the platform attempting to execute the code set. In alternate embodiments, the host platform is the destination platform upon which the application corresponding to the code set is to be migrated.

At step 603, the code set is pre-processed to identify portions of the code set which are compatible with the host platform determined at step 601. Pre-processing the code set may comprise, for example, pre-compiling the code set to determine the existence of platform indicators matching the host platform. In one embodiment, the platform indicators are implemented as structured "comments" within the code set. Traditionally, comments are specifically designated within a code set are used for documentation purposes, and routine code set compilation typically disregards the portions of the code set designated as comments. According to one embodiment, the comments may be structured (and/or written according to a specific syntax) such that portions designated as comments may be identified as platform indicators during pre-compilation. In one embodiment, the structured comments may be interspersed between portions of the code set that are compatible with different platforms. The comments may, for example, indicate explicitly the platform(s) compatible for an immediately following portion.

In alternate embodiments, platform indicators may be implemented as programmed instructions. In one embodiment, the programmed instructions may comprise a subroutine according to a "begin/end" format, wherein actual compilation is performed pursuant a platform verification completed in the subroutine. The programmed instructions may precede the portions of the code set compatible with specific platforms, whereupon those portions of the code set are identified (and subsequently compiled and executed) only after a determination that the portion corresponds to the host platform made during pre-processing of the programmed instructions.

At step 605, the portions of the code set identified at step 603 as being compatible with the host platform (determined at step 601) are compiled. In typical embodiments, portions of the code set identified at step 603 as being incompatible with the host platform are not compiled. In further embodiments, only portions of the code set compatible with the host platform are identified; non-compatible portions are not identified and are disregarded during step 605.

Thus, by pre-processing a code set comprising portions compatible with multiple platforms, a single code set may be maintained for an application whilst still allowing the application to execute on disparate platforms, thereby advantageously reducing the complexity of managing multiple, platform specific sets of programmed instructions and increasing the efficiency of developing the code set further.

Evaluating Applications for Migration

Figure 7:
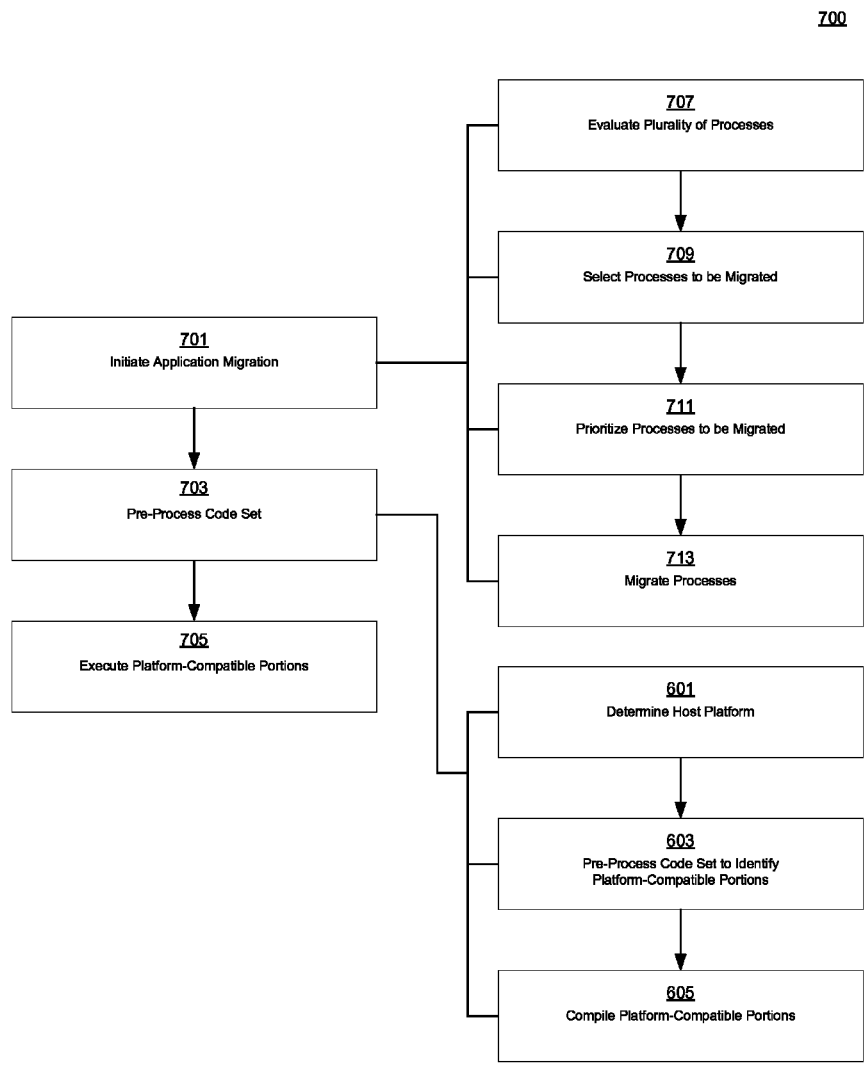
FIG. 7 depicts an exemplary flowchart of a process of migrating processes between a first platform to a second platform in a multi-platform system, in accordance with various embodiments of the present invention.

With reference to FIG. 7, an exemplary flowchart 700 of a process of optimizing the distribution of applications between platforms in a multi-platform system is depicted, in accordance with various embodiments of the present invention. Steps 701-713 describe exemplary steps of the flowchart 700 in accordance with the various embodiments herein described. In one embodiment, flowchart 700 is provided to identify which part of an application executing in the system that should be migrated to the lower-cost platform without increasing the risk of the organization or increasing network latency.

In one embodiment, the process for migrating applications between platforms in multi-platform systems as depicted in FIG. 7 may be performed in response to the performance of a process of pre-processing a single code set corresponding to an application to determine compatible portions of the code set with a host platform, such as the process described above with reference to FIG. 6. Alternatively, the migration according to FIG. 7 may be performed prior to the pre-processing according to FIG. 6. For example, pre-processing a code set of an application may be performed after an application is migrated to a new host platform. Pre-processing is then performed to determine the portions of the code set which are compatible with the new host platform. FIG. 7 displays this sequence, wherein the application is migrated at step 701. In one embodiment, migration is accomplished by performing steps 707 to 713.

Once an application is migrated (e.g., step 701 is completed), the code set is pre-processed at step 703. Pre-processing may be performed according to steps 601-605 described above with reference to FIG. 6. Once compatible portions of the code set are pre-processed and identified, those platform-compatible portions may be executed at step 709. Alternatively, steps 601-605 may be performed initially, with migration being performed pursuant to identification of portions of the code set compatible with the target or destination platform.

Steps 707-713 consist of steps in an exemplary process for migrating an application, process or transaction between platforms in a multi-platform process. At step 707, an evaluation of an application or a process or transaction performed by an application executing in a higher-cost platform for suitability of migration is initiated. Evaluation of a process or transaction may include, for example, selecting a process executing in a higher-cost platform for evaluation. In one embodiment, an application's candidacy may be determined by evaluating the application's dependencies and relative coupling to the underlying operating system. In still further embodiments, the application's candidacy may include an estimated savings in computing cost.

In further embodiments, an evaluation of a process may include a determination of whether the process is platform specific. Platform-specificity may include, for example, a high level of dependency on platform resources, rather than total platform specificity. If the process is determined to be platform dependent, the process or transaction may not be considered a candidate for migration and another process or transaction is selected for evaluation. However, if the process is determined to not be platform specific, the process proceeds to step 709.

At step 709, a plurality of migration candidates is selected for migration. The migration candidates are collected by aggregating the processes which have been evaluated at step 707 as candidates for migration. In some embodiments, these candidates have also been determined to not be excessively coupled to the underlying platform or operating system.

At step 711, each process, transaction or application in the plurality of migration candidates selected at step 709 for migration may be ordered according to a priority for migration. The priority for migration may be determined according to a variety of metrics which may include, but are not limited to, the cost of migration, the availability of platform compatible code sets and the reliability of the application, process or transaction, after a migration. According to some embodiments, the cost of migration may be calculated by, for example, considering the computing savings for the collection of processes by generating the CPU consumption of the particular transaction, application, or process, and parsing the source code for the application or process to determine the number of operands in the source code. The cost of the plurality of processes can be further calculated by comparing the respective numbers of operands and CPU consumptions to determine the estimated savings. According to still further embodiments, the migration may be organized into a series of sequential stages to reduce the risk to the system.

Finally, at step 713 the processes may be migrated in compliance with the stages defined at step 711.

Accordingly, significant operational costs may be mitigated in mainframe operation through the use of multiple platforms by optimizing the distribution of applications and processes between those platforms. These allocations may be further enhanced by executing from single code sets of the applications that are compatible with the multiple platforms, thereby potentially reducing the complexity of developing the application for multiple platforms. Pre-processing of the single code sets extends this ability to programming language lacking inherent conditional compiling capability.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
obtaining a set of computer instructions associated with a software application;
identifying, by a computing platform on which the set of computer instructions are to be executed, portions of the computer instructions that are each immediately preceded by a respective platform-specific, platform verification subroutine;
before compiling the set of computer instructions, invoking, by the computing platform on which the set of computer instructions are to be executed, each of the platform-specific, platform verification subroutines, and identifying the platform-specific, platform verification subroutines that successfully complete;
compiling, by the computing platform on which the set of computer instructions are to be executed, a proper subset of the computer instructions, including compiling one or more of the portions of the computer instructions that are immediately preceded by the platform-specific, platform verification subroutines that successfully complete without compiling one or more of the portions of the computer instructions that are immediately preceded by the platform-specific, platform verification subroutines that did not successfully complete; and
executing, by the computing platform, the compiled computer instructions.

2. The method of claim 1, wherein the particular computing platform is a platform that is executing in a logical partition on a mainframe.

3. The method of claim 1, wherein the computer instructions are written in a computer language that does not inherently support pre-compiling.

4. The method of claim 3, wherein the computer instructions are written in COBOL.

5. The method of claim 1, wherein identifying the type of computing platform comprises determining that the software application is to be migrated on to the particular computing platform.

6. The method of claim 1, wherein the computer instructions are included in a single code set that is compatible with multiple platforms.

7. A system comprising:
one or more computers and one or more storage devices storing instructions that are operable, when executed by the one or more computers, to cause the one or more computers to perform operations comprising:
obtaining a set of computer instructions associated with a software application;
identifying, by a computing platform on which the set of computer instructions are to be executed, portions of the computer instructions that are each immediately preceded by a respective platform-specific, platform verification subroutine;
before compiling the set of computer instructions, invoking, by the computing platform on which the set of computer instructions are to be executed, each of the platform-specific, platform verification subroutines, and identifying the platform-specific, platform verification subroutines that successfully complete;
compiling, by the computing platform on which the set of computer instructions are to be executed, a proper subset of the computer instructions, including compiling one or more of the portions of the computer instructions that are immediately preceded by the platform-specific, platform verification subroutines that successfully complete, without compiling one or more of the portions of the computer instructions that are immediately preceded by the platform-specific, platform verification subroutines that did not successfully complete; and
executing, by the computing platform, the compiled computer instructions.

8. The system of claim 7, wherein the particular computing platform is a platform that is executing in a logical partition on a mainframe.

9. The system of claim 7, wherein the computer instructions are written in a computer language that does not inherently support pre-compiling.

10. The system of claim 9, wherein the computer instructions are written in COBOL.

11. The system of claim 7, wherein identifying the type of computing platform comprises determining that the software application is to be migrated on to the particular computing platform.

12. The system of claim 7, wherein the computer instructions are included in a single code set that is compatible with multiple platforms.

13. A non-transitory computer-readable medium storing software comprising instructions executable by one or more computers which, upon such execution, cause the one or more computers to perform operations comprising:
obtaining a set of computer instructions associated with a software application;
identifying, by a computing platform on which the set of computer instructions are to be executed, portions of the computer instructions that are each immediately preceded by a respective platform-specific, platform verification subroutine;
before compiling the set of computer instructions, invoking, by the computing platform on which the set of computer instructions are to be executed, each of the platform-specific, platform verification subroutines, and identifying the platform-specific, platform verification subroutines that successfully complete;
compiling, by the computing platform on which the set of computer instructions are to be executed, a proper subset of the computer instructions, including compiling one or more of the portions of the computer instructions that are immediately preceded by the platform-specific, platform verification subroutines that successfully complete, without compiling one or more of the portions of the computer instructions that are immediately preceded by the platform-specific, platform verification subroutines that did not successfully complete; and
executing, by the computing platform, the compiled computer instructions.

14. The medium of claim 13, wherein the particular computing platform is a platform that is executing in a logical partition on a mainframe.

15. The medium of claim 13, wherein the computer instructions are written in a computer language that does not inherently support pre-compiling.

16. The medium of claim 13, wherein identifying the type of computing platform comprises determining that the software application is to be migrated on to the particular computing platform.

* * * * *

UNITED STATES PATENT AND TRADEMARK OFFICE
CERTIFICATE OF CORRECTION

| | | |
|---|---|---|
| PATENT NO. | : 9,027,005 B2 | Page 1 of 1 |
| APPLICATION NO. | : 14/297694 | |
| DATED | : May 5, 2015 | |
| INVENTOR(S) | : Neft | |

It is certified that error appears in the above-identified patent and that said Letters Patent is hereby corrected as shown below:

In the claims

Column 11, Line 21, Claim 1, delete "complete" and insert --complete,--

Signed and Sealed this
Third Day of November, 2015

Michelle K. Lee
*Director of the United States Patent and Trademark Office*